United States Patent [19]

Kroeger

[11] 4,456,272
[45] Jun. 26, 1984

[54] HUNTING BLIND AND ICE FISHING SHED

[76] Inventor: Donald E. Kroeger, Box 149, Rte. 2, Elkhorn, Nebr. 68022

[21] Appl. No.: 418,533

[22] Filed: Sep. 15, 1982

[51] Int. Cl.³ .......................................... B62B 13/00
[52] U.S. Cl. .................................... 280/12 S; 52/36; 220/DIG. 13; 280/12 C
[58] Field of Search ................ 135/109; 114/351; 52/36; 280/12 C, 12 S; 220/DIG. 13; D22/99; 244/121, 129.3; 296/215; 180/126, 127

[56] References Cited

U.S. PATENT DOCUMENTS

| | | | |
|---|---|---|---|
| 1,285,467 | 11/1918 | Thiessen et al. | 52/71 |
| 2,147,798 | 2/1939 | Pilcher | 280/12 C X |
| 2,237,385 | 4/1941 | Anderson | 52/36 X |
| 2,464,884 | 3/1949 | Noyes | 280/12 S |
| 2,572,732 | 10/1951 | Keklen et al. | 52/36 |
| 2,971,728 | 2/1961 | Martin | 244/121 |
| 3,018,857 | 1/1962 | Parham | 52/36 X |
| 3,194,517 | 7/1965 | Morris et al. | 244/121 |
| 3,492,015 | 1/1970 | Kuhn et al. | 280/125 |
| 3,513,605 | 5/1970 | Smith | 43/1 |
| 3,787,912 | 1/1974 | Huey, Jr. | 114/351 |
| 3,971,395 | 7/1976 | Lipinski | 135/109 X |
| 4,018,016 | 4/1977 | Zale | 52/36 |
| 4,389,066 | 6/1983 | Weir et al. | 280/12 S X |

Primary Examiner—Joseph F. Peters, Jr.
Assistant Examiner—Michael Mar
Attorney, Agent, or Firm—Zarley, McKee, Thomte, Voorhees & Sease

[57] ABSTRACT

A portable hunting blind and ice fishing shed is described including a bottom portion having front, back and opposite side walls. The bottom portion has an open upper end which is closed by means of a pair of transparent cover members hingedly secured to the front and back walls of the bottom portion. The interior of the blind or shed is provided with seats which extend inwardly from the front and back walls and which also define storage areas. A pair of skis are provided at the lower end of the blind and shed to enable the unit to be pulled to fields or the like. A pair of hinged flap members are provided at the lower ends of the front and back walls to facilitate pulling of the unit through the fields.

4 Claims, 3 Drawing Figures

HUNTING BLIND AND ICE FISHING SHED

BACKGROUND OF THE INVENTION

This invention relates to a portable enclosure adapted for use as a hunting blind or an ice fishing shed.

Many types of hunting blinds and ice fishing sheds have been previously provided. Although the blinds and ice fishing sheds are suppose to be portable, the prior art devices are extremely cumbersome and are difficult to move from one location to another. Ordinarily, the prior art devices must be loaded on the bed of a truck and then moved to the appropriate location.

Still another disadvantage of the prior art hunting blinds and ice fishing sheds is that they do not provide adequate protection from the weather.

Therefore, it is a principal object of the invention to provide an improved hunting blind and/or ice fishing shed.

Still another object of the invention is to provide a hunting blind and/or ice fishing shed which is easily transportable.

Still another object of the invention is to provide a portable hunting blind and ice fishing shed which may be easily pulled through a field or the like.

Still another object of the invention is to provide a portable hunting blind and ice fishing shed which may be placed in the bed of a pick-up truck or placed upon a small trailer.

Still another object of the invention is to provide a portable hunting blind and ice fishing shed which is convenient to use.

These and other objects will be apparent to those skilled in the art.

SUMMARY OF THE INVENTION

Figure 1:
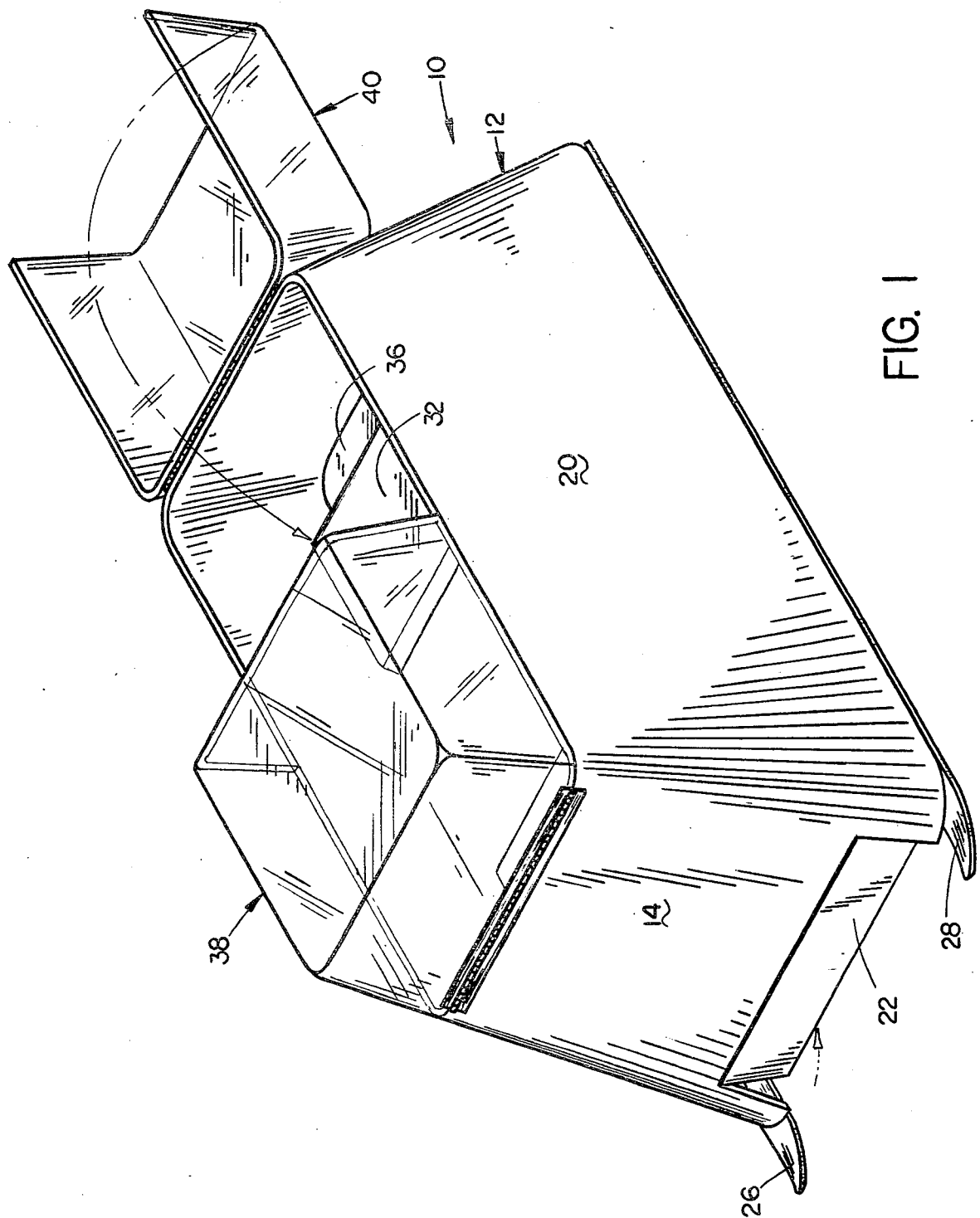
FIG. 1 is a perspective view of the hunting blind and ice fishing shed with one of the covers pivotally moved to its open position.
Figure 2:
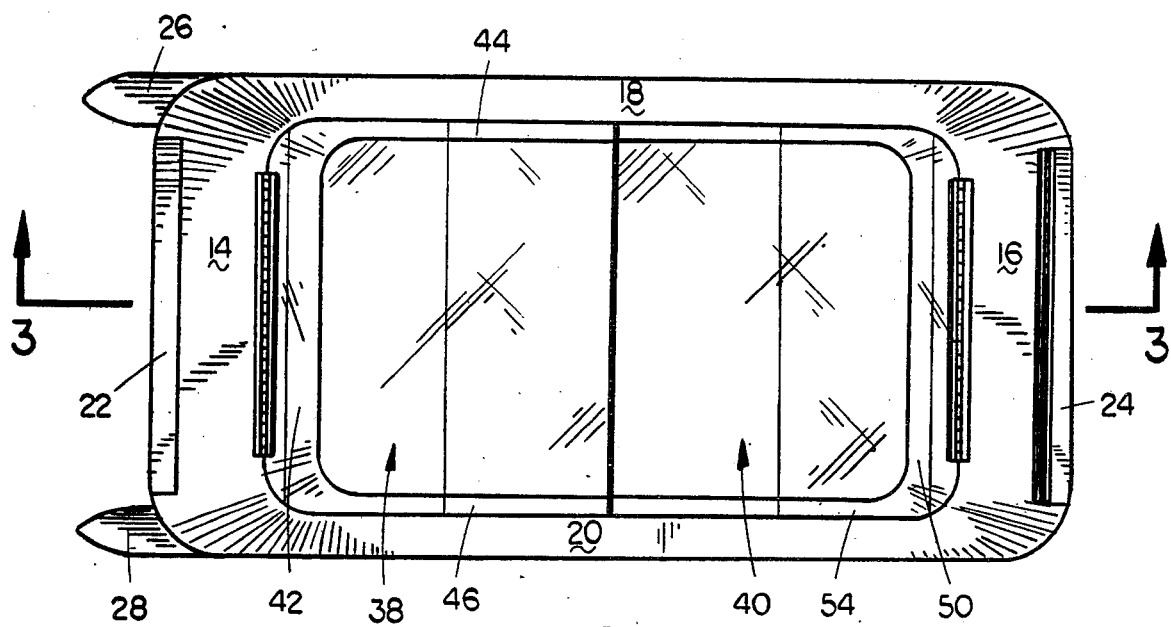
FIG. 2 is a top view of the portable hunting blind and ice fishing shed.

A portable hunting blind and ice fishing shed is disclosed which may be easily moved from one location to another. The hunting blind and ice fishing shed has a width sufficiently narrow to enable it to be placed within the bed of a pick-up truck or placed upon a small trailer. The hunting blind and ice fishing shed comprises a bottom unit having front, back, and opposite side walls. The open upper end of the bottom portion is selectively closed by a pair of transparent cover members. A pair of spaced-apart skis are provided at the lower end of the bottom portion to enable the blind and shed to be pulled through the field or across the ice to the desired location.

DESCRIPTION OF THE PREFERRED EMBODIMENT

The portable enclosure which may be used as either a hunting blind or an ice fishing shed is referred to generally by the reference numeral 10. Enclosure 10 includes a bottom portion 12 including front wall 14, back wall 16 and opposite side walls 18 and 20. As seen in the drawings, the walls 14, 16, 18 and 20 extend upwardly and inwardly from their lower to upper ends. Front wall 14 and back wall 16 are provided with a pair of flap members 22 and 24 respectively which are hingedly secured thereto.

Figure 3:
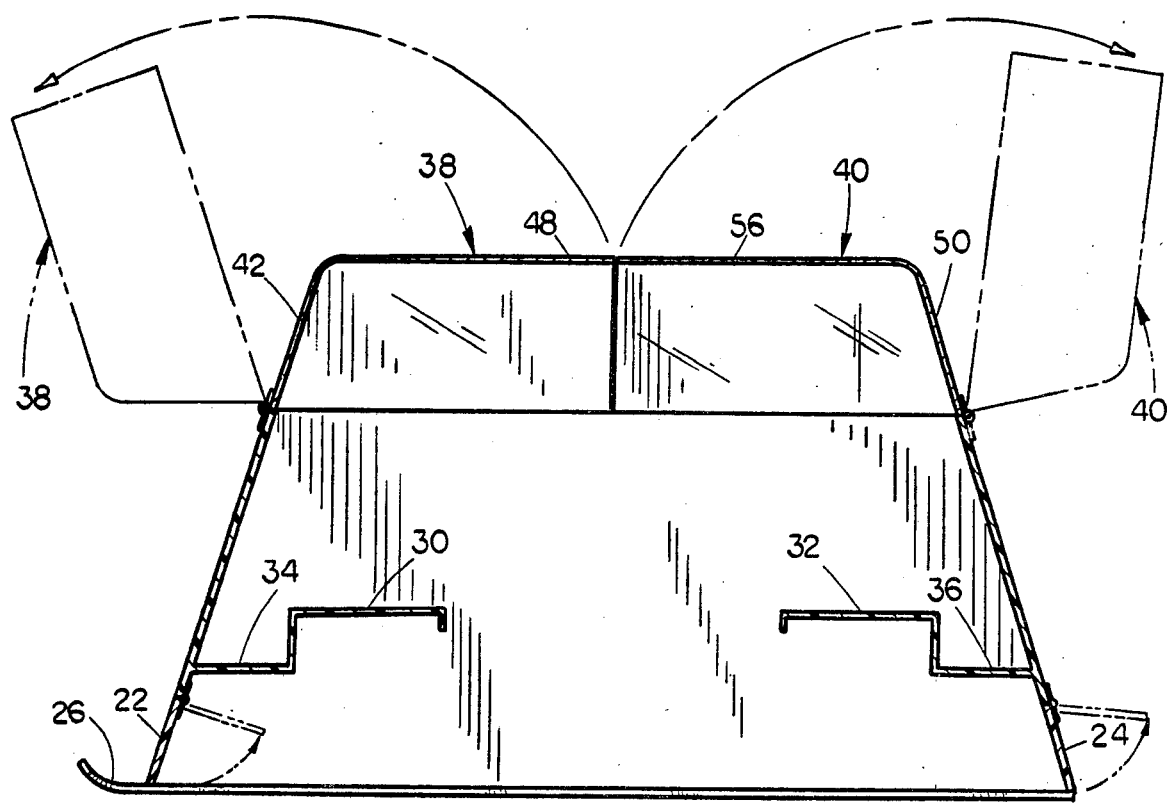
FIG. 3 is a sectional view as seen on lines 3—3 of FIG. 2 with the broken lines illustrating the covers being pivotally moved towards their open positions.

A pair of elongated skis 26 and 28 are secured to the lower end of bottom portion 12 in a spaced-apart manner as best seen in the drawings. A pair of seats 30 and 32 are provided in the interior of the enclosure and extend inwardly toward each other as best illustrated in FIG. 3. The seats 30 and 32 are formed so as to provide storage areas 34 and 36 for shells, tackle, etc.

The open upper end of the bottom portion 12 is selectively closed by a pair of cover members 38 and 40 which are hingedly secured to the upper ends of front wall 14 and back wall 16 respectively. Cover members 38 includes front wall 42, side walls 44 and 46 and top wall 48. Cover member 40 comprises back wall 50, side walls 52 and 54, and top wall 56. Cover members 38 and 40 are comprised of a clear transparent material such as plexiglass or the like to enable the hunters to see outwardly therethrough when the enclosure is being used as a hunting blind and to permit light to enter the interior thereof when the enclosure is being used as an ice fishing shed.

In use, the enclosure may be easily transported from one location to another by placing the same in the bed or box of a pick-up truck or on a small trailer. The width of the enclosure is such that it will easily fit into the pick-up truck or on the trailer. The enclosure may be easily pulled through the field or across the ice due to the provision of the skis 26 and 28 thereon. The flap members 22 and 24 aid in pulling the enclosure through snow, weeds or cornstalks since the flat members simply pivotally move rearwardly when they encounter the snow, weeds or cornstalks.

Entry is achieved to the interior of the enclosure by simply pivotally moving one or both of the cover members 38 and 40 to their open position. The hunter or fisherman may sit on the seats 30 and 32 and store their shells, tackle, etc. in the areas 34 and 36. Once the hunter is in the interior of the enclosure, the cover members 38 and 40 are closed but the clear transparent construction of the same enables the hunter to observe the ducks, geese, etc. When the hunter or hunters desire to shoot, the covers 38 and 40 are pivotally moved to the open position.

It is recommended that the exterior surface of the enclosure be painted with a camouflage paint if the enclosure is going to be used as a hunting blind. If the enclosure is going to be used as an ice fishing shed or if the enclosure is going to be used as a hunting blind in snow conditions, the enclosure is preferably painted white. When the enclosure is being used as an ice fishing shed, the enclosure gives adequate protection to the fisherman from the weather elements and the open bottom of the bottom portion permits the fisherman to fish through the ice.

Thus it can be seen that the invention accomplishes at least all of its stated objectives.

I claim:

1. A portable hunting blind, comprising,
    a bottom portion having front and back walls, and opposite side walls,
    said bottom portion having an open upper end,
    and a transparent top portion hingedly secured to said bottom portion for selectively closing said open upper end of said bottom portion, said top portion comprising first and second cover members hingedly secured to said bottom portion,
an upstanding front wall portion, a pair of spaced-apart upstanding side wall portions extending rearwardly from said front wall portion and a top wall portion extending between the upper ends of said front wall portion and said side wall portion, the lower end of said front wall portion being hingedly secured to the upper end of the front wall of said bottom portion, said second cover member comprising an upstanding back wall portion hingedly secured to the upper end of said back wall of said bottom portion, a pair of spaced-apart upstanding side wall portions extending forwardly from said back wall portion, and a top wall portion extending between said upper ends of said back wall portion and said side wall portions.

2. The blind of claim 1 wherein said bottom portion includes seats extending inwardly from the inside surfaces of said back and front walls thereof.

3. The blind of claim 2 wherein said seats also define storage areas.

4. A portable hunting blind, comprising,
a bottom portion having front and back walls, and opposite side walls,
said bottom portion having open upper and lower ends,
and a transparent top portion hingedly secured to said bottom portion for selectively closing said open upper end of said bottom portion,
a pair of skis secured to the lower end of said bottom portion,
a first flap member hingedly secured to the lower end of said front wall,
a second flap member hingedly secured to the lower end of said back wall,
said flap members extending substantially the complete width of said front and back walls,
said flap members pivoting about their upper ends, upon engaging an obstruction, to permit the hunting blind to be pulled through a field.

* * * * *